US010008211B2

(12) United States Patent
Zhang et al.

(10) Patent No.: US 10,008,211 B2
(45) Date of Patent: Jun. 26, 2018

(54) METHOD AND APPARATUS FOR ENCODING STEREO PHASE PARAMETER

(71) Applicant: Huawei Technologies Co., Ltd., Shenzhen (CN)

(72) Inventors: Xingtao Zhang, Beijing (CN); Lei Miao, Beijing (CN); Wenhai Wu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days. days.

(21) Appl. No.: 15/154,655

(22) Filed: May 13, 2016

(65) Prior Publication Data

US 2016/0254002 A1 Sep. 1, 2016

Related U.S. Application Data

(63) Continuation of application No. PCT/CN2014/074673, filed on Apr. 2, 2014.

(30) Foreign Application Priority Data

Nov. 29, 2013 (CN) .......................... 2013 1 0632664

(51) Int. Cl.
*H04B 15/00* (2006.01)
*G10L 19/008* (2013.01)

(52) U.S. Cl.
CPC .................................. *G10L 19/008* (2013.01)

(58) Field of Classification Search
CPC .... G10L 19/008; G10L 19/20; H04S 2420/03
USPC ................................ 381/94.2, 94.3, 119, 23
See application file for complete search history.

(56) References Cited

U.S. PATENT DOCUMENTS 8,258,849 B2 9/2012 Lee et al.
8,385,556 B1 2/2013 Warner et al.
8,538,762 B2 9/2013 Moon et al.
2002/0103637 A1* 8/2002 Henn .................... G10L 21/038
704/206

(Continued)

FOREIGN PATENT DOCUMENTS

CN 101221763 A 7/2008
CN 101809655 A 8/2010

(Continued)

OTHER PUBLICATIONS

Faller, "Parametric Coding of Spatial Audio," Thesis, pp. i-164 (2004).

*Primary Examiner* — Alexander Jamal
(74) *Attorney, Agent, or Firm* — Leydig, Voit & Mayer, Ltd.

(57) ABSTRACT

Present disclosure discloses a method and an apparatus for encoding a stereo phase parameter, which relate to the field of information technologies and can improve an effect of stereo audio phase information. The method includes: first, acquiring a global stereo phase parameter of a current frame; then, determining a value of the global stereo phase parameter of the current frame, and adjusting the value of the global stereo phase parameter of the current frame according to a determining result of the value of the global stereo phase parameter of the current frame; and finally, encoding an adjusted value of the global stereo phase parameter of the current frame. The embodiments of the present disclosure are applicable to recovering stereo phase information.

20 Claims, 6 Drawing Sheets

(56) References Cited

U.S. PATENT DOCUMENTS

| | | | |
|---|---|---|---|
| 2003/0219130 A1 | 11/2003 | Baumgarte et al. | |
| 2011/0255714 A1* | 10/2011 | Neusinger ............. | G10L 19/008 381/119 |
| 2011/0301962 A1 | 12/2011 | Wu et al. | |
| 2011/0311061 A1 | 12/2011 | Oshikiri | |
| 2012/0300945 A1 | 11/2012 | Wu et al. | |
| 2013/0195276 A1* | 8/2013 | Ojala .................... | G10L 19/008 381/2 |
| 2013/0282384 A1 | 10/2013 | Gibbs | |

FOREIGN PATENT DOCUMENTS

| | | | |
|---|---|---|---|
| CN | 102132340 | A | 7/2011 |
| CN | 102157152 | A | 8/2011 |
| CN | 102165520 | A | 8/2011 |
| CN | 102292769 | A | 12/2011 |
| JP | 2012512438 | A | 5/2012 |
| KR | 20100035122 | A | 4/2010 |
| WO | WO 2006027717 | A1 | 3/2006 |
| WO | WO 2010098120 | A1 | 9/2010 |
| WO | WO 2013120531 | A1 | 8/2013 |
| WO | WO 2013149671 | A1 | 10/2013 |

* cited by examiner

METHOD AND APPARATUS FOR ENCODING STEREO PHASE PARAMETER

CROSS-REFERENCE TO RELATED APPLICATIONS

This application is a continuation of International Patent Application No. PCT/CN2014/074673, filed on Apr. 2, 2014, which claims priority to Chinese Patent Application No. 201310632664.5, filed on Nov. 29, 2013, both of which are hereby incorporated by reference in their entireties.

TECHNICAL FIELD

The present disclosure relates to the field of information technologies, and in particular, to a method and an apparatus for encoding a stereo phase parameter.

BACKGROUND

As material living standards of people are increasingly improved, people set a higher requirement on an audio effect. Compared with a monaural audio, a stereo audio has a sense of direction and a sense of distribution for various sound sources, which can improve clarity of audio information, so that the stereo audio can better meet the requirement of people for the audio effect.

Currently, when a stereo audio signal is being acquired, a global parameter is extracted, and stereo phase information is recovered according to the global parameter. The global parameter includes a G_ITD (Global Inter-Channel Time Difference, group delay) and a G_IPD (Global Inter-Channel Phase Difference, group phase).

However, when the stereo phase information is directly recovered by extracting the global parameter, the extracted G_and G_IPD have relatively low accuracy, and original stereo phase information cannot be recovered according to the G_ITD and G_IPD, causing a relatively poor effect of stereo audio phase information.

SUMMARY

Embodiments of the present disclosure provide a method and an apparatus for encoding a stereo phase parameter, which can improve an effect of stereo audio phase information.

Technical solutions used in the embodiments of the present disclosure are as follows:

According to a first aspect, an embodiment of the present disclosure provides a method for encoding a stereo phase parameter, where the method includes:

- acquiring a global stereo phase parameter of a current frame;
- determining a value of the global stereo phase parameter of the current frame;
- adjusting the value of the global stereo phase parameter of the current frame according to a determining result of the value of the global stereo phase parameter of the current frame; and
- encoding an adjusted value of the global stereo phase parameter of the current frame.

In a first implementation manner of the first aspect, the adjusting the value of the global stereo phase parameter of the current frame according to a determining result of the value of the global stereo phase parameter of the current frame specifically includes:

acquiring inter-channel time differences of sub-bands of the current frame;

calculating an average value of absolute values of the inter-channel time differences of the sub-bands of the current frame according to the inter-channel time differences of the sub-bands of the current frame; and adjusting the value of the global stereo phase parameter of the current frame according to the determining result of the value of the global stereo phase parameter of the current frame and the average value of the absolute values of the inter-channel time differences of the sub-bands of the current frame.

With reference to the first aspect or the first implementation manner of the first aspect, in a second implementation manner of the first aspect, when the current frame is not the first data frame of a data stream, and before the adjusting the value of the global stereo phase parameter of the current frame according to the determining result of the value of the global stereo phase parameter of the current frame and the average value of the absolute values of the inter-channel time differences of the sub-bands of the current frame, the method further includes:

performing inter-frame smoothing processing on the average value of the absolute values of the inter-channel time differences of the sub-bands of the current frame, and acquiring a smoothed average value of the absolute values of the inter-channel time differences of the sub-bands of the current frame; and the adjusting the value of the global stereo phase parameter of the current frame according to the determining result of the value of the global stereo phase parameter of the current frame and the average value of the absolute values of the inter-channel time differences of the sub-bands of the current frame specifically includes:

adjusting the value of the global stereo phase parameter of the current frame according to the determining result of the value of the global stereo phase parameter of the current frame and the smoothed average value of the absolute values of the inter-channel time differences of the sub-bands of the current frame.

With reference to the first aspect, the first implementation manner of the first aspect, or the second implementation manner of the first aspect, in a third implementation manner of the first aspect, the global stereo phase parameter includes a group delay (G_ITD) parameter; and the adjusting the value of the global stereo phase parameter of the current frame according to the determining result of the value of the global stereo phase parameter of the current frame and the smoothed average value of the absolute values of the inter-channel time differences of the sub-bands of the current frame includes:

when the determining result of the value of the global stereo phase parameter of the current frame is that a value of the G_ITD parameter is not 0, adjusting the value of the G_ITD parameter of the current frame according to the smoothed average value of the absolute values of the inter-channel time differences of the sub-bands of the current frame.

With reference to the first aspect, the first implementation manner of the first aspect, the second implementation manner of the first aspect, or the third implementation manner of the first aspect, in a fourth implementation manner of the first aspect, the adjusting the value of the G_ITD parameter of the current frame according to the smoothed average value of the absolute values of the inter-channel time differences of the sub-bands of the current frame is specifically:

adjusting an absolute value of the value of the G_ITD parameter of the current frame according to a formula $|G\_ITD'|=fac1\times|G\_ITD|+fac2\times ITD\_sm$, where $|G\_ITD'|$ is an adjusted absolute value of the value of the G_ITD parameter, $|G\_ITD|$ is the absolute value of the value of the G_ITD parameter, ITD_sm is the smoothed average value of the absolute values of the inter-channel time differences of the sub-bands of the current frame, fac1 and fac2 are smoothing factors, where $fac1>0$, $fac2>0$, and $fac1+fac2=1$.

With reference to the first aspect, the first implementation manner of the first aspect, the second implementation manner of the first aspect, the third implementation manner of the first aspect, or the fourth implementation manner of the first aspect, in a fifth implementation manner of the first aspect, $fac1=0.5$.

With reference to the first aspect, the first implementation manner of the first aspect, the second implementation manner of the first aspect, the third implementation manner of the first aspect, the fourth implementation manner of the first aspect, or the fifth implementation manner of the first aspect, in a sixth implementation manner of the first aspect, the global stereo phase parameter includes the group delay (G_ITD) parameter and a group phase (G_IPD) parameter; and the adjusting the value of the global stereo phase parameter of the current frame according to the determining result of the value of the global stereo phase parameter of the current frame and the smoothed average value of the absolute values of the inter-channel time differences of the sub-bands of the current frame includes:

when the determining result of the value of the global stereo phase parameter of the current frame is that the value of the G_ITD parameter is 0, adjusting a value of the G_IPD parameter of the current frame according to the smoothed average value of the absolute values of the inter-channel time differences of the sub-bands of the current frame.

With reference to the first aspect, the first implementation manner of the first aspect, the second implementation manner of the first aspect, the third implementation manner of the first aspect, the fourth implementation manner of the first aspect, the fifth implementation manner of the first aspect, or the sixth implementation manner of the first aspect, in a seventh implementation manner of the first aspect, when the determining result of the value of the global stereo phase parameter of the current frame is that the value of the G_ITD parameter is 0 and the value of the G_IPD parameter of the current frame is not 0, the adjusting a value of the G_IPD parameter of the current frame according to the smoothed average value of the absolute values of the inter-channel time differences of the sub-bands of the current frame specifically includes:

adjusting an absolute value of the value of the G_IPD parameter according to a formula $|G\_IPD'|=fac3\times|G\_IPD|+fac4\times IPD\_sm$, where $|G\_IPD'|$ is an adjusted absolute value of the value of the G_IPD parameter; $|G\_IPD|$ is the absolute value of the value of the G_IPD parameter; fac3 and fac4 are smoothing factors, where $fac3>0$, $fac4>0$ and $fac3+fac4=1$; and $$IPD\_sm = \frac{2\pi K \times ITD\_sm}{FFT\_LEN},$$

where FFT_LEN is a transform length, K is a frequency bin value, ITD_sm is the smoothed average value of the absolute values of the inter-channel time differences of the sub-bands of the current frame, and IPD_sm is a smoothed average value of absolute values of inter-channel phase differences of the sub-bands of the current frame.

With reference to the first aspect, the first implementation manner of the first aspect, the second implementation manner of the first aspect, the third implementation manner of the first aspect, the fourth implementation manner of the first aspect, the fifth implementation manner of the first aspect, the sixth implementation manner of the first aspect, or the seventh implementation manner of the first aspect, in an eighth implementation manner of the first aspect, $fac3=0.75$.

With reference to the first aspect, the first implementation manner of the first aspect, the second implementation manner of the first aspect, the third implementation manner of the first aspect, the fourth implementation manner of the first aspect, the fifth implementation manner of the first aspect, the sixth implementation manner of the first aspect, the seventh implementation manner of the first aspect, or the eighth implementation manner of the first aspect, in a ninth implementation manner of the first aspect, when the determining result of the value of the global stereo phase parameter of the current frame is that the value of the G_ITD parameter is 0 and the value of the G_IPD parameter of the current frame is 0, the adjusting a value of the G_IPD parameter of the current frame according to the smoothed average value of the absolute values of the inter-channel time differences of the sub-bands of the current frame specifically includes:

using a smoothed average value of absolute values of inter-channel phase differences of the sub-bands of the current frame as an absolute value of the value of G_IPD parameter of the current frame, and using a symbol of a G_IPD parameter of a previous frame of the current frame as a symbol of the G_IPD parameter of the current frame.

With reference to the first aspect, the first implementation manner of the first aspect, the second implementation manner of the first aspect, the third implementation manner of the first aspect, the fourth implementation manner of the first aspect, the fifth implementation manner of the first aspect, the sixth implementation manner of the first aspect, the seventh implementation manner of the first aspect, the eighth implementation manner of the first aspect, or the ninth implementation manner of the first aspect, in a tenth implementation manner of the first aspect, the performing inter-frame smoothing processing on the average value of the absolute values of the inter-channel time differences of the sub-bands of the current frame, and acquiring a smoothed average value of the absolute values of the inter-channel time differences of the sub-bands of the current frame includes:

performing inter-frame smoothing processing according to a formula $ITD\_sm(k)=fac5\times ITD\_sm(k-1)+fac6\times ITD$, where ITD_sm(k) is the smoothed average value of the absolute values of the inter-channel time differences of the sub-bands of the current frame, ITD_sm(k−1) is a smoothed average value of absolute values of inter-channel time differences of sub-bands of the previous frame of the current frame, and fac5 and fac6 are smoothing factors, where $fac5>0$, $fac6>0$, and $fac5+fac6=1$.

With reference to the first aspect, the first implementation manner of the first aspect, the second implementation manner of the first aspect, the third implementation manner of the first aspect, the fourth implementation manner of the first aspect, the fifth implementation manner of the first aspect, the sixth implementation manner of the first aspect, the seventh implementation manner of the first aspect, the eighth implementation manner of the first aspect, the ninth implementation manner of the first aspect, or the tenth implementation manner of the first aspect, in an eleventh implementation manner of the first aspect, fac5=0.9844.

According to a first aspect, an embodiment of the present disclosure provides an apparatus for encoding a stereo phase parameter, where the apparatus includes:

an acquisition unit, configured to acquire a global stereo phase parameter of a current frame;

a determining unit, configured to determine a value of the global stereo phase parameter of the current frame acquired by the acquisition unit;

an adjustment unit, configured to adjust the value of the global stereo phase parameter of the current frame according to a determining result of the value of the global stereo phase parameter of the current frame determined by the determining unit; and an encoding unit, configured to encode a value of the global stereo phase parameter of the current frame adjusted by the adjustment unit.

In a first implementation manner of the second aspect, the adjustment unit includes:

an acquisition module, configured to acquire inter-channel time differences of sub-bands of the current frame;

a calculation module, configured to calculate an average value of absolute values of the inter-channel time differences of the sub-bands of the current frame according to the inter-channel time differences of the sub-bands of the current frame acquired by the acquisition module; and an adjustment module, configured to adjust the value of the global stereo phase parameter of the current frame according to the determining result of the value of the global stereo phase parameter of the current frame and the average value of the absolute values of the inter-channel time differences of the sub-bands of the current frame calculated by the calculation module.

With reference to the second aspect or the first implementation manner of the second aspect, in a second implementation manner of the second aspect, the adjustment unit further includes:

a processing module, configured to perform inter-frame smoothing processing on the average value of the absolute values of the inter-channel time differences of the sub-bands of the current frame calculated by the calculation module; where the acquisition module is further configured to acquire an average value of the absolute values of the inter-channel time differences of the sub-bands of the current frame smoothed by the processing module; and the adjustment module is further configured to adjust the value of the global stereo phase parameter of the current frame according to the determining result of the value of the global stereo phase parameter of the current frame and the smoothed average value of the absolute values of the inter-channel time differences of the sub-bands of the current frame acquired by the acquisition module.

With reference to the second aspect, the first implementation manner of the second aspect, or the second implementation manner of the second aspect, in a third implementation manner of the second aspect, the global stereo phase parameter acquired by the acquisition unit includes a group delay (G_ITD) parameter; and the adjustment module is further configured to: when the determining result of the value of the global stereo phase parameter of the current frame is that a value of the G_ITD parameter is not 0, adjust the value of the G_ITD parameter of the current frame according to the smoothed average value of the absolute values of the inter-channel time differences of the sub-bands of the current frame acquired by the acquisition module.

With reference to the second aspect, the first implementation manner of the second aspect, the second implementation manner of the second aspect, or the third implementation manner of the second aspect, in a fourth implementation manner of the second aspect, the adjustment module is further configured to adjust an absolute value of the value of the G_ITD parameter of the current frame according to a formula $|G\_ITD'|=fac1\times|G\_ITD|+fac2\times ITD\_sm$, where $|G\_ITD'|$ is an adjusted absolute value of the value of the G_ITD parameter, $|G\_ITD|$ is the absolute value of the value of the G_ITD parameter, ITD_sm is the smoothed average value of the absolute values of the inter-channel time differences of the sub-bands of the current frame, and fac1 and fac2 are smoothing factors where $fac1>0$, $fac2>0$, and $fac1+fac2=1$.

With reference to the second aspect, the first implementation manner of the second aspect, the second implementation manner of the second aspect, the third implementation manner of the second aspect, or the fourth implementation manner of the second aspect, in a fifth implementation manner of the second aspect, the smoothing factor during adjustment by the adjustment module meets: fac1=0.5.

With reference to the second aspect, the first implementation manner of the second aspect, the second implementation manner of the second aspect, the third implementation manner of the second aspect, the fourth implementation manner of the second aspect, or the fifth implementation manner of the second aspect, in a sixth implementation manner of the second aspect, the global stereo phase parameter acquired by the acquisition unit includes the group delay (G_ITD) parameter and a group phase (G_IPD) parameter; and the adjustment module is further configured to: when the determining result of the value of the global stereo phase parameter of the current frame is that the value of the G_ITD parameter is 0, adjust a value of the G_IPD parameter of the current frame according to the smoothed average value of the absolute values of the inter-channel time differences of the sub-bands of the current frame acquired by the acquisition module.

With reference to the second aspect, the first implementation manner of the second aspect, the second implementation manner of the second aspect, the third implementation manner of the second aspect, the fourth implementation manner of the second aspect, the fifth implementation manner of the second aspect, or the sixth implementation manner of the second aspect, in a seventh implementation manner of the second aspect, the adjustment module is further configured to: when the determining result of the value of the global stereo phase parameter of the current frame is that the value of the G_ITD parameter is 0 and the value of the G_IPD parameter of the current frame is not 0, adjust an absolute value of the value of the G_IPD parameter according to a formula $|G\_IPD'|=fac3\times|G\_IPD|+fac4\times IPD\_sm$, where $|G\_IPD'|$ is an adjusted absolute value of the value of the G_IPD parameter; $|G\_IPD|$ is the absolute value of the value of the G_IPD parameter; fac3 and fac4 are smoothing factors, where $fac3>0$, $fac4>0$, and $fac3+fac4=1$; and $$IPD\_sm = \frac{2\pi K \times ITD\_sm}{FFT\_LEN},$$

where FFT_LEN is a transform length, K is a frequency bin value, ITD_sm is the smoothed average value of the absolute values of the inter-channel time differences of the sub-bands of the current frame, and IPD_sm is a smoothed average value of absolute values of inter-channel phase differences of the sub-bands of the current frame.

With reference to the second aspect, the first implementation manner of the second aspect, the second implementation manner of the second aspect, the third implementation manner of the second aspect, the fourth implementation manner of the second aspect, the fifth implementation manner of the second aspect, the sixth implementation manner of the second aspect, or the seventh implementation manner of the second aspect, in an eighth implementation manner of the second aspect, the smoothing factor during adjustment by the adjustment module meets: fac3=0.75.

With reference to the second aspect, the first implementation manner of the second aspect, the second implementation manner of the second aspect, the third implementation manner of the second aspect, the fourth implementation manner of the second aspect, the fifth implementation manner of the second aspect, the sixth implementation manner of the second aspect, the seventh implementation manner of the second aspect, or the eighth implementation manner of the second aspect, in a ninth implementation manner of the second aspect, the adjustment unit further includes:

a configuration module, configured to: when the determining result of the value of the global stereo phase parameter of the current frame is that the value of the G_ITD parameter is 0 and the value of the G_IPD parameter of the current frame is 0, use an average value of absolute values of inter-channel phase differences of the sub-bands of the current frame smoothed by the processing module, as an absolute value of the value of G_IPD parameter of the current frame, and use a symbol of a G_IPD parameter of a previous frame of the current frame as a symbol of the G_IPD parameter of the current frame.

With reference to the second aspect, the first implementation manner of the second aspect, the second implementation manner of the second aspect, the third implementation manner of the second aspect, the fourth implementation manner of the second aspect, the fifth implementation manner of the second aspect, the sixth implementation manner of the second aspect, the seventh implementation manner of the second aspect, the eighth implementation manner of the second aspect, or the ninth implementation manner of the second aspect, in a tenth implementation manner of the second aspect, the processing module is further configured to perform inter-frame smoothing processing according to a formula $ITD\_sm(k)=fac5\times ITD\_sm(k-1)+fac6\times ITD$, where $ITD\_sm(k)$ is the smoothed average value of the absolute values of the inter-channel time differences of the sub-bands of the current frame, $ITD\_sm(k-1)$ is a smoothed average value of absolute values of inter-channel time differences of sub-bands of the previous frame of the current frame, and fac5 and fac6 are smoothing factors, where $fac5>0$ $fac6>0$, and $fac5+fac6=1$.

With reference to the second aspect, the first implementation manner of the second aspect, the second implementation manner of the second aspect, the third implementation manner of the second aspect, the fourth implementation manner of the second aspect, the fifth implementation manner of the second aspect, the sixth implementation manner of the second aspect, the seventh implementation manner of the second aspect, the eighth implementation manner of the second aspect, the ninth implementation manner of the second aspect, or the tenth implementation manner of the second aspect, in an eleventh implementation manner of the second aspect, the smoothing factor during smoothing processing by the processing module meets: fac5=0.9844.

According to the method and the apparatus for encoding a stereo phase parameter that are provided in the embodiments of the present disclosure, first, a global stereo phase parameter of a current frame is acquired; then, a value of the global stereo phase parameter of the current frame is determined, and the value of the global stereo phase parameter of the current frame is adjusted according to a determining result of the value of the global stereo phase parameter of the current frame; and finally, an adjusted value of the global stereo phase parameter of the current frame is encoded. Compared with the existing technology that stereo phase information is directly recovered by extracting a global parameter, in the embodiments of the present disclosure, stereo phase information is recovered by using an adjusted global parameter, which can improve accuracy of the stereo phase information, thereby improving an effect of stereo audio phase information.

BRIEF DESCRIPTION OF DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

To make the advantages of the technical solutions of the present disclosure clearer, the following describes the present disclosure in detail with reference to the accompanying drawings and embodiments.

Figure 1:
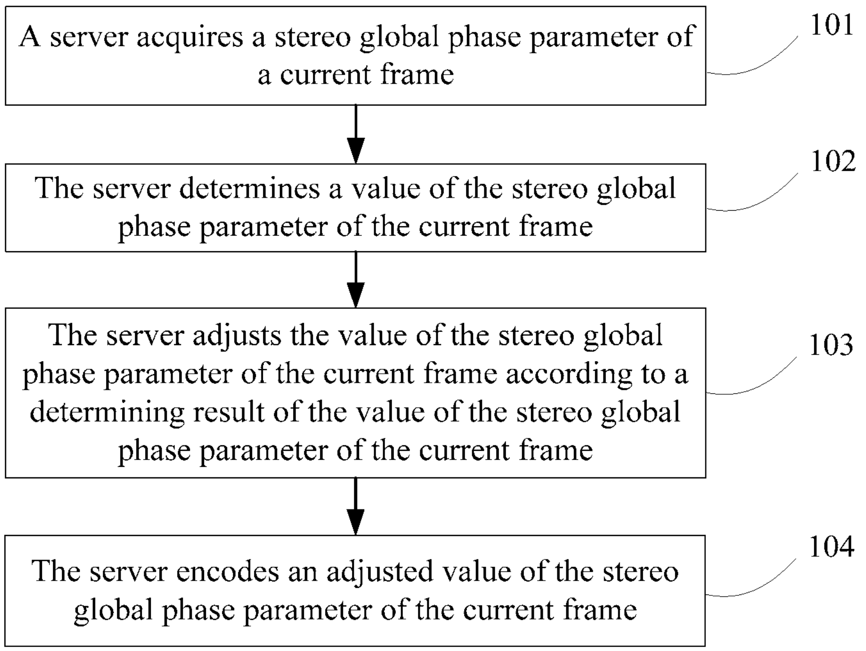
FIG. 1 is a flowchart of a method for encoding a stereo phase parameter according to an embodiment of the present disclosure.

An embodiment of the present disclosure provides a method for encoding a stereo phase parameter, and as shown in FIG. 1, the method includes:

101. A server acquires a global stereo phase parameter of a current frame.

The global stereo phase parameter includes a group delay (G_ITD) and a group phase (G_IPD). In this embodiment of the present disclosure, the group delay (G_ITD) represents a time delay between an audio-left channel and an audio-right channel of a stereo, in a measurement unit of samples. The group phase (G_IPD) represents waveform similarity between the audio-left channel and the audio-right channel of the stereo after time alignment, in a measurement unit of radian whose value range is (−π, π].

102. The server determines a value of the global stereo phase parameter of the current frame.

A determining result of the value of the global stereo phase parameter of the current frame includes: a value of the G_ITD parameter of the current frame is not 0, the value of the G_ITD parameter of the current frame is 0 and a value of the G_IPD parameter of the current frame is not 0, and the value of the G_ITD parameter of the current frame is 0 and the value of the G_IPD parameter of the current frame is 0.

103. The server adjusts the value of the global stereo phase parameter of the current frame according to a determining result of the value of the global stereo phase parameter of the current frame.

In this embodiment of the present disclosure, when the extracted global stereo phase parameters G_ITD and G_IPD of the current frame are less accurate, the server cannot recover original stereo phase information according to the stereo phase parameters, and therefore, cannot recover a stereo audio signal. In this embodiment of the present disclosure, the server adjusts the G_ITD or the G_IPD, which can avoid that stereo phase information is recovered according to the G_ITD and the G_IPD that differ greatly from an original stereo phase parameter, and therefore can improve an effect of stereo audio phase information.

104. The server encodes an adjusted value of the global stereo phase parameter of the current frame.

The server may encode the adjusted value of the global stereo phase parameter of the current frame in a manner of 5-bit (bit) quantizing and encoding, where the first bit is a flag bit of the stereo phase parameter, and the second bit to the fifth bit are values obtained after encoding processing is performed on the adjusted value of the global stereo phase parameter of the current frame. Specifically, when flag=1, the server transmits a quantized value of the G_of the current frame; when flag=0, the server transmits a quantized value of the G_IPD of the current frame.

According to the method for encoding a stereo phase parameter provided in this embodiment of the present disclosure, first, a global stereo phase parameter of a current frame is acquired; then, a value of the global stereo phase parameter of the current frame is determined, and the value of the global stereo phase parameter of the current frame is adjusted according to a determining result of the value of the global stereo phase parameter of the current frame; and finally, an adjusted value of the global stereo phase parameter of the current frame is encoded. Compared with the existing technology that stereo phase information is directly recovered by extracting a global parameter, in this embodiment of the present disclosure, stereo phase information is recovered by using an adjusted global parameter, which can improve accuracy of the stereo phase information, thereby improving an effect of stereo audio phase information.

Figure 2:
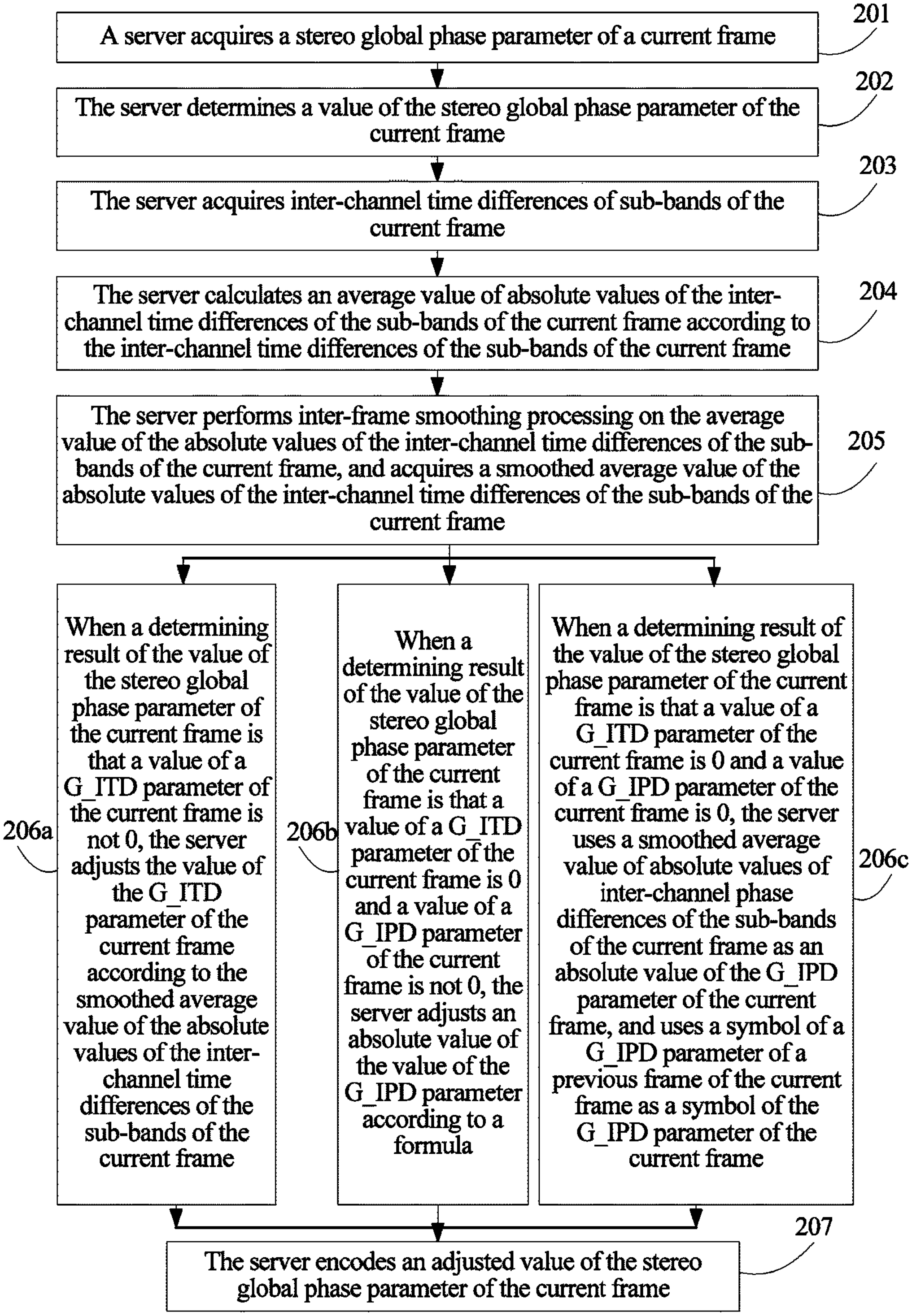
FIG. 2 is a flowchart of another method for encoding a stereo phase parameter according to an embodiment of the present disclosure.

An embodiment of the present disclosure provides another method for encoding a stereo phase parameter. As shown in FIG. 2, the method includes:

201. A server acquires a global stereo phase parameter of a current frame.

The global stereo phase parameter includes a group delay (G_ITD) and a group phase (G_IPD). In this embodiment of the present disclosure, the group delay (G_ITD) represents a time delay between an audio-left channel and an audio-right channel of a stereo, in a measurement unit of samples. The group phase (G_IPD) represents waveform similarity between the audio-left channel and the audio-right channel of the stereo after time alignment, in a measurement unit of radian whose value range is (−π, π].

202. The server determines a value of the global stereo phase parameter of the current frame.

A determining result of the value of the global stereo phase parameter of the current frame includes: a value of the G_ITD parameter of the current frame is not 0, the value of the G_ITD parameter of the current frame is 0 and a value of the G_IPD parameter of the current frame is not 0, and the value of the G_ITD parameter of the current frame is 0 and the value of the G_IPD parameter of the current frame is 0.

203. The server acquires inter-channel time differences of sub-bands of the current frame.

The sub-bands of the current frame may be divided in advance by the server. For example, the server may divide a frequency band into 12 sub-bands, where each sub-band has a corresponding inter-channel time difference.

In this embodiment of the present disclosure, the inter-channel time difference is used to represent a difference between time when a sound arrives at the left ear and time when a sound arrives at the right ear. When the ITD is a value greater than 0, the time when the sound arrives at the left ear is earlier than the time when the sound arrives at the right ear; when the ITD is a value less than 0, the time when the sound arrives at the left ear is later than the time when the sound arrives at the right ear; when the ITD is equal to 0, the time when the sound arrives at the left ear is the same as the time when the sound arrives at the right ear. In this embodiment of the present disclosure, the ITD may be represented by using a sample. For example, a time interval of the ITD is (−5 ms, 5 ms), in a measurement unit of ms (millisecond, millisecond). After the server performs sampling at a 16 kHz bandwidth, a corresponding sample interval is (−80, 80), in a measurement unit of samples.

204. The server calculates an average value of absolute values of the inter-channel time differences of the sub-bands of the current frame according to the inter-channel time differences of the sub-bands of the current frame.

In this embodiment of the present disclosure, the server may calculate the average value of the absolute values of the inter-channel time differences of the sub-bands of the current frame according to a formula $$ITD = \frac{1}{L}\sum_{b=1}^{L}|ITD(b)|,$$

where ITD is the average value of absolute values of the inter-channel time differences of the sub-bands, ITD(b) is an inter-channel time difference of the $b^{th}$ sub-band, where b is an integer greater than or equal to 1 and less than or equal to L, and L is a total quantity of sub-bands.

205. The server performs inter-frame smoothing processing on the average value of the absolute values of the inter-channel time differences of the sub-bands of the current frame, and acquires a smoothed average value of the absolute values of the inter-channel time differences of the sub-bands of the current frame.

Specifically, step 205 may be that the server performs inter-frame smoothing processing on the average value of the absolute values of the inter-channel time differences of the sub-bands of the current frame according to a formula ITD_sm(k)=fac5×ITD_sm(k−1)+fac6×ITD, and acquires the smoothed average value of the absolute values of the inter-channel time differences of the sub-bands of the current frame, where ITD_sm(k) is the smoothed average value of the absolute values of the inter-channel time differences of the sub-bands of the current frame, ITD_sm(k−1) is a smoothed average value of absolute values of inter-channel time differences of sub-bands of a previous frame of the current frame, and fac5 and fac6 are smoothing factors, where fac5>0, fac6>0, and fac5+fac6=1.

In this embodiment of the present disclosure, a value of the smoothing factor fac5 may be: fac5=0.9844, and a corresponding smoothing factor fac6 may be: fac6=1−0.9844=0.0156.

In this embodiment of the present disclosure, the server may perform smoothing processing between adjacent data frames of the current frame, so that a situation in which a stereo audio signal changes suddenly when stereo phase information corresponding to the adjacent data frames of the current frame changes suddenly can be avoided, and an effect of a stereo audio can be further improved.

When the determining result of the value of the global stereo phase parameter of the current frame is that the value of the G_ITD parameter of the current frame is not 0, step 206*a* is performed: The server adjusts the value of the G_ITD parameter of the current frame according to the smoothed average value of the absolute values of the inter-channel time differences of the sub-bands of the current frame.

Specifically, step 206*a* may be that when the determining result of the value of the global stereo phase parameter of the current frame is that the value of the G_ITD parameter of the current frame is not 0, the server adjusts an absolute value of the value of the G_ITD parameter of the current frame according to a formula |G_ITD'|=fac1×|G_ITD|+fac2×ITD_sm, where |G_ITD'| is an adjusted absolute value of the value of the G_ITD parameter, |G_ITD| is the absolute value of the value of the G_ITD parameter, ITD_sm is the smoothed average value of the absolute values of the inter-channel time differences of the sub-bands of the current frame, and fac1 and fac2 are smoothing factors where fac1>0, fac2>0, and fac1+fac2=1.

In this embodiment of the present disclosure, a value of the smoothing factor fac1 may be fac1=0.5, and a corresponding smoothing factor fac2 may be fac2=1−0.5=0.5.

When the determining result of the value of the global stereo phase parameter of the current frame is that the value of the G_ITD parameter of the current frame is 0 and the value of the G_IPD parameter of the current frame is not 0, step 206*b* is performed: The server adjusts an absolute value of the value of the G_IPD parameter according to a formula |G_IPD'|=fac3×|G_IPD|+fac4×IPD_sm, where |G_IPD'| is an adjusted absolute value of the value of the G_IPD parameter; |G_IPD| is the absolute value of the value of the G_IPD parameter; fac3 and fac4 are smoothing factors, where fac3>0 fac4>0, and fac3+fac4=1; and $$\text{IPD\_sm} = \frac{2\pi K \times \text{ITD\_sm}}{\text{FFT\_LEN}},$$

where FFT_LEN is a transform length, K is a frequency bin value, ITD_sm is the smoothed average value of the absolute values of the inter-channel time differences of the sub-bands of the current frame, and IPD_sm is a smoothed average value of absolute values of inter-channel phase differences of the sub-bands of the current frame.

In this embodiment of the present disclosure, a value of the smoothing factor fac3 may be: fac=0.75, and a corresponding smoothing fact fac4 may be: fac4=1−0.75=0.25.

When the determining result of the value of the global stereo phase parameter of the current frame is that the value of the G_ITD parameter of the current frame is 0 and the value of the G_IPD parameter of the current frame is 0, step 206*c* is performed: The server uses a smoothed average value of absolute values of inter-channel phase differences of the sub-bands of the current frame as an absolute value of the G_IPD parameter of the current frame, and uses a symbol of a G_IPD parameter of a previous frame of the current frame as a symbol of the G_IPD parameter of the current frame.

In this embodiment of the present disclosure, the server may calculate the smoothed average value of the absolute values of the inter-channel phase differences of the sub-bands of the current frame according to a formula $$\text{IPD\_sm} = \frac{2\pi K \times \text{ITD\_sm}}{\text{FFT\_LEN}},$$

where FFT_LEN is a transform length, K is a frequency bin value, ITD_sm is the smoothed average value of the absolute values of the inter-channel time differences of the sub-bands of the current frame, and IPD_sm is the smoothed average value of the absolute values of the inter-channel phase differences of the sub-bands of the current frame.

207. The server encodes an adjusted value of the global stereo phase parameter of the current frame.

The server may encode the adjusted value of the global stereo phase parameter of the current frame in a manner of 5-bit (bit) quantizing and encoding, where the first bit is a flag bit of the stereo phase parameter, and the second bit to the fifth bit are values obtained after encoding processing is performed on the adjusted value of the global stereo phase parameter of the current frame. Specifically, when flag=1, the server transmits a quantized value of the G_ITD of the current frame; when flag=0, the server transmits a quantized value of the G_IPD of the current frame.

According to the method for encoding a stereo phase parameter provided in this embodiment of the present disclosure, first, a global stereo phase parameter of a current frame is acquired; then, a value of the global stereo phase parameter of the current frame is determined, and the value of the global stereo phase parameter of the current frame is adjusted according to a determining result of the value of the global stereo phase parameter of the current frame; and finally, an adjusted value of the global stereo phase parameter of the current frame is encoded. Compared with the existing technology that stereo phase information is directly recovered by extracting a global parameter, in this embodiment of the present disclosure, stereo phase information is recovered by using an adjusted global parameter, which can improve accuracy of the stereo phase information, thereby improving an effect of stereo audio phase information.

Figure 3:
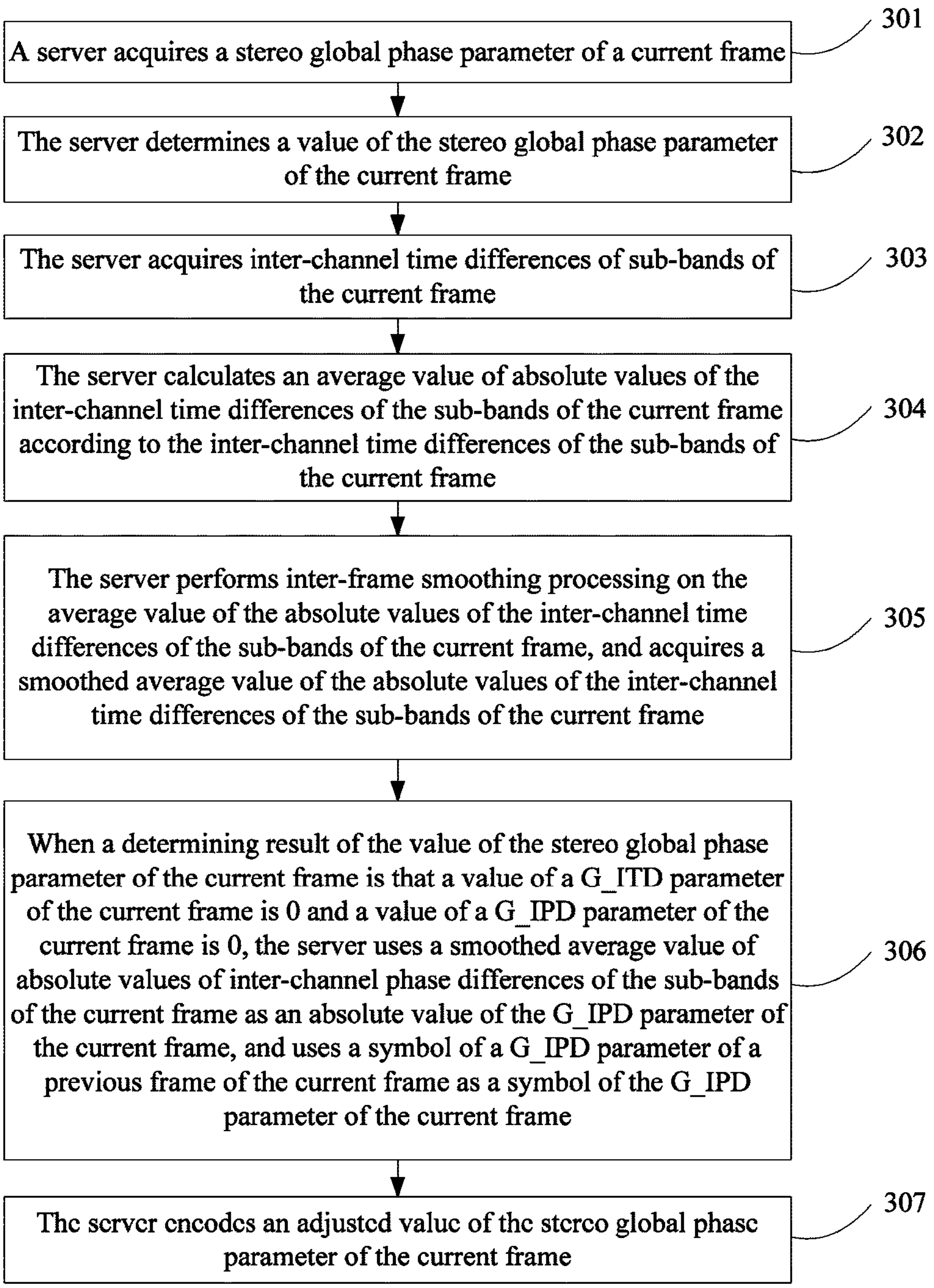
FIG. 3 is a flowchart of still another method for encoding a stereo phase parameter according to an embodiment of the present disclosure.

An embodiment of the present disclosure provides still another method for encoding a stereo phase parameter, which is applicable to adjustment in a case in which values of both a G_parameter and a G_IPD parameter of a current frame are 0. As shown in FIG. 3, the method includes:

301. A server acquires a global stereo phase parameter of a current frame.

The global stereo phase parameter includes a group delay (G_ITD) and a group phase (G_IPD). In this embodiment of the present disclosure, the group delay (G_ITD) represents a time delay between an audio-left channel and an audio-right channel of a stereo, in a measurement unit of samples. The group phase (G_IPD) represents waveform similarity between the audio-left channel and the audio-right channel of the stereo after time alignment, in a measurement unit of radian whose value range is $(-\pi, \pi]$.

302. The server determines a value of the global stereo phase parameter of the current frame.

A determining result of the value of the global stereo phase parameter of the current frame includes: a value of the G_ITD parameter of the current frame is not 0, the value of the G_ITD parameter of the current frame is 0 and a value of the G_IPD parameter of the current frame is not 0, and the value of the G_ITD parameter of the current frame is 0 and the value of the G_IPD parameter of the current frame is 0.

303. The server acquires inter-channel time differences of sub-bands of the current frame.

The sub-bands of the current frame may be divided in advance by the server. For example, the server may divide a frequency band into 12 sub-bands, where each sub-band has a corresponding inter-channel time difference.

In this embodiment of the present disclosure, the inter-channel time difference is used to represent a difference between time when a sound arrives at the left ear and time when a sound arrives at the right ear. When the ITD is a value greater than 0, the time when the sound arrives at the left ear is earlier than the time when the sound arrives at the right ear; when the ITD is a value less than 0, the time when the sound arrives at the left ear is later than the time when the sound arrives at the right ear; when the ITD is equal to 0, the time when the sound arrives at the left ear is the same as the time when the sound arrives at the right ear. In this embodiment of the present disclosure, the ITD may be represented by using a sample. For example, a time interval of the ITD is (−5 ms, 5 ms), in a measurement unit of ms (millisecond, millisecond). After the server performs sampling at a 16 kHz bandwidth, a corresponding sample interval is (−80, 80), in a measurement unit of samples.

304. The server calculates an average value of absolute values of the inter-channel time differences of the sub-bands of the current frame according to the inter-channel time differences of the sub-bands of the current frame.

In this embodiment of the present disclosure, the server may calculate the average value of the absolute values of the inter-channel time differences of the sub-bands of the current frame according to a formula $$ITD = \frac{1}{L}\sum_{b=1}^{L} |ITD(b)|,$$

where ITD is the average value of absolute values of the inter-channel time differences of the sub-bands, ITD(b) is an inter-channel time difference of the $b^{th}$ sub-band, where b is an integer greater than or equal to 1 and less than or equal to L, and L is a total quantity of sub-bands.

305. The server performs inter-frame smoothing processing on the average value of the absolute values of the inter-channel time differences of the sub-bands of the current frame, and acquires a smoothed average value of the absolute values of the inter-channel time differences of the sub-bands of the current frame.

Specifically, step 305 may be that the server performs inter-frame smoothing processing on the average value of the absolute values of the inter-channel time differences of the sub-bands of the current frame according to a formula ITD_sm(k)=fac5×ITD_sm(k−1)+fac6×ITD, and acquires the smoothed average value of the absolute values of the inter-channel time differences of the sub-bands of the current frame, where ITD_sm(k) is the smoothed average value of the absolute values of the inter-channel time differences of the sub-bands of the current frame, ITD_sm(k−1) is a smoothed average value of absolute values of inter-channel time differences of sub-bands of a previous frame of the current frame, and fac5 and fac6 are smoothing factors, where fac5>0, fac6>0, and fac5+fac6=1.

In this embodiment of the present disclosure, a value of the smoothing factor fac5 may be: fac5=0.9844, and a corresponding smoothing factor fac6 may be: fac6=1−0.9844=0.0156.

In this embodiment of the present disclosure, the server may perform smoothing processing between adjacent data frames of the current frame, so that a situation in which a stereo audio signal changes suddenly when stereo phase information corresponding to the adjacent data frames of the current frame changes suddenly can be avoided, and an effect of a stereo audio can be further improved.

306. When a determining result of the value of the global stereo phase parameter of the current frame is that a value of a G_ITD parameter of the current frame is 0 and a value of a G_IPD parameter of the current frame is 0, the server uses a smoothed average value of absolute values of inter-channel phase differences of the sub-bands of the current frame as an absolute value of the G_IPD parameter of the current frame, and uses a symbol of a G_IPD parameter of a previous frame of the current frame as a symbol of the G_IPD parameter of the current frame.

In this embodiment of the present disclosure, the server may calculate the smoothed average value of the absolute values of the inter-channel phase differences of the sub-bands of the current frame according to a formula $$\text{IPD\_sm} = \frac{2\pi K \times \text{ITD\_sm}}{\text{FFT\_LEN}},$$

where FFT_LEN is a transform length, K is a frequency bin value, ITD_sm is the smoothed average value of the absolute values of the inter-channel time differences of the sub-bands of the current frame, and IPD_sm is the smoothed average value of the absolute values of the inter-channel phase differences of the sub-bands of the current frame.

307. The server encodes an adjusted value of the global stereo phase parameter of the current frame.

The server may encode the adjusted value of the global stereo phase parameter of the current frame in a manner of 5-bit (bit) quantizing and encoding, where the first bit is a flag bit of the stereo phase parameter, and the second bit to the fifth bit are values obtained after encoding processing is performed on the adjusted value of the global stereo phase parameter of the current frame. Specifically, when flag=1, the server transmits a quantized value of the G_ITD of the current frame; when flag=0, the server transmits a quantized value of the G_IPD of the current frame.

According to the method for encoding a stereo phase parameter provided in this embodiment of the present disclosure, first, a global stereo phase parameter of a current frame is acquired; then, a value of the global stereo phase parameter of the current frame is determined, and the value of the global stereo phase parameter of the current frame is adjusted according to a determining result of the value of the global stereo phase parameter of the current frame; and finally, an adjusted value of the global stereo phase parameter of the current frame is encoded. Compared with the existing technology that stereo phase information is directly recovered by extracting a global parameter, in this embodiment of the present disclosure, stereo phase information is recovered by using an adjusted global parameter, which can improve accuracy of the stereo phase information, thereby improving an effect of stereo audio phase information.

Figure 4:
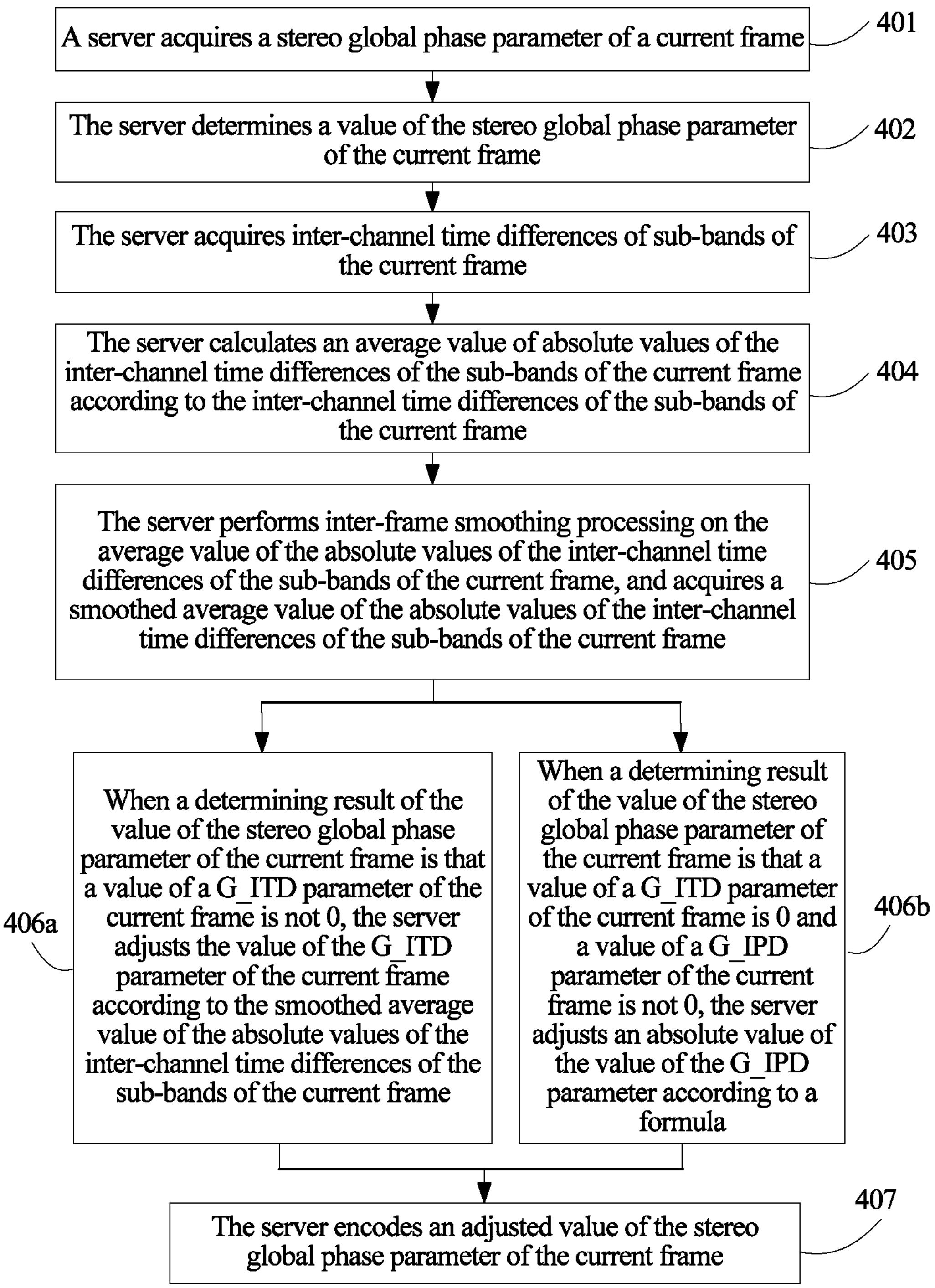
FIG. 4 is a flowchart of yet another method for encoding a stereo phase parameter according to an embodiment of the present disclosure.

An embodiment of the present disclosure provides yet another method for encoding a stereo phase parameter, which is applicable to adjustment in a case in which either a value of a G_ITD parameter of a current frame or a value of a G_IPD parameter of a current frame is 0. As shown in FIG. 4, the method includes:

401. A server acquires a global stereo phase parameter of a current frame.

The global stereo phase parameter includes a group delay (G_ITD) and a group phase (G_IPD). In this embodiment of the present disclosure, the group delay (G_ITD) represents a time delay between an audio-left channel and an audio-right channel of a stereo, in a measurement unit of samples. The group phase (G_IPD) represents waveform similarity between the audio-left channel and the audio-right channel of the stereo after time alignment, in a measurement unit of radian whose value range is $(-\pi, \pi]$.

402. The server determines a value of the global stereo phase parameter of the current frame.

A determining result of the value of the global stereo phase parameter of the current frame includes: a value of the G_parameter of the current frame is not 0, the value of the G_ITD parameter of the current frame is 0 and a value of the G_IPD parameter of the current frame is not 0, and the value of the G_ITD parameter of the current frame is 0 and the value of the G_IPD parameter of the current frame is 0.

403. The server acquires inter-channel time differences of sub-bands of the current frame.

The sub-bands of the current frame may be divided in advance by the server. For example, the server may divide a frequency band into 12 sub-bands, where each sub-band has a corresponding inter-channel time difference.

In this embodiment of the present disclosure, the inter-channel time difference is used to represent a difference between time when a sound arrives at the left ear and time when a sound arrives at the right ear. When the ITD is a value greater than 0, the time when the sound arrives at the left ear is earlier than the time when the sound arrives at the right ear; when the ITD is a value less than 0, the time when the sound arrives at the left ear is later than the time when the sound arrives at the right ear; when the ITD is equal to 0, the time when the sound arrives at the left ear is the same as the time when the sound arrives at the right ear. In this embodiment of the present disclosure, the ITD may be represented by using a sample. For example, a time interval of the ITD is (−5 ms, 5 ms), in a measurement unit of ms (millisecond, millisecond). After the server performs sampling at a 16 kHz bandwidth, a corresponding sample interval is (−80, 80), in a measurement unit of samples.

404. The server calculates an average value of absolute values of the inter-channel time differences of the sub-bands of the current frame according to the inter-channel time differences of the sub-bands of the current frame.

In this embodiment of the present disclosure, the server may calculate the average value of the absolute values of the inter-channel time differences of the sub-bands of the current frame according to a formula $$ITD = \frac{1}{L}\sum_{b=1}^{L}|ITD(b)|,$$

where ITD is the average value of absolute values of the inter-channel time differences of the sub-bands, ITD(b) is an inter-channel time difference of the $b^{th}$ sub-band, where b is an integer greater than or equal to 1 and less than or equal to L, and L is a total quantity of sub-bands.

405. The server performs inter-frame smoothing processing on the average value of the absolute values of the inter-channel time differences of the sub-bands of the current frame, and acquires a smoothed average value of the absolute values of the inter-channel time differences of the sub-bands of the current frame.

Specifically, step 405 may be that the server performs inter-frame smoothing processing on the average value of the absolute values of the inter-channel time differences of the sub-bands of the current frame according to a formula $ITD\_sm(k)=fac5\times ITD\_sm(k-1)+fac6\times ITD$, and acquires the smoothed average value of the absolute values of the inter-channel time differences of the sub-bands of the current frame, where ITD_sm(k) is the smoothed average value of the absolute values of the inter-channel time differences of the sub-bands of the current frame, ITD_sm(k−1) is a smoothed average value of absolute values of inter-channel time differences of sub-bands of a previous frame of the current frame, and fac5 and fac6 are smoothing factors, where fac5>0, fac6>0, and fac5+fac6=1.

In this embodiment of the present disclosure, a value of the smoothing factor fac5 may be: fac5=09844, and a corresponding smoothing factor fac6 may be: fac6=1−0.9844=0.0156.

In this embodiment of the present disclosure, the server may perform smoothing processing between adjacent data frames of the current frame, so that a situation in which a stereo audio signal changes suddenly when stereo phase information corresponding to the adjacent data frames of the current frame changes suddenly can be avoided, and an effect of a stereo audio can be further improved.

When the determining result of the value of the global stereo phase parameter of the current frame is that the value of the G_ITD parameter of the current frame is not 0, step 406*a* is performed: The server adjusts the value of the G_ITD parameter of the current frame according to the smoothed average value of the absolute values of the inter-channel time differences of the sub-bands of the current frame.

Specifically, step 406*a* may be that when the determining result of the value of the global stereo phase parameter of the current frame is that the value of the G_ITD parameter of the current frame is not 0, the server adjusts an absolute value of the value of the G_ITD parameter of the current frame according to a formula |G_ITD'|=fac1×|G_ITD|+fac2×ITD_sm, where |G_ITD'| is an adjusted absolute value of the value of the G_ITD parameter, |G_ITD| is the absolute value of the value of the G_ITD parameter, ITD_sm is the smoothed average value of the absolute values of the inter-channel time differences of the sub-bands of the current frame, and fac1 and fac2 are smoothing factors where fac1>0 fac2>0, and fac1+fac2=1.

In this embodiment of the present disclosure, a value of the smoothing factor fac1 may be fac1=0.5, and a corresponding smoothing fac2 may be: fac2=1−0.5=0.5.

When the determining result of the value of the global stereo phase parameter of the current frame is that the value of the G_ITD parameter of the current frame is 0 and the value of the G_IPD parameter of the current frame is not 0, step 406*b* is performed: The server adjusts an absolute value of the value of the G_IPD parameter according to a formula |G_IPD'|=fac3×|G_IPD|+fac4×IPD_sm, where |G_IPD'| is an adjusted absolute value of the value of the G_IPD parameter; |G_IPD| is the absolute value of the value of G_IPD parameter; fac3 and fac4 are smoothing factors, where fac3>0, fac4>0, and fac3+fac4=1; and $$\text{IPD\_sm} = \frac{2\pi K \times \text{ITD\_sm}}{\text{FFT\_LEN}},$$

where FFT_LEN is a transform length, K is a frequency bin value, ITD_sm is the smoothed average value of the absolute values of the inter-channel time differences of the sub-bands of the current frame, and IPD_sm is a smoothed average value of absolute values of inter-channel phase differences of the sub-bands of the current frame.

In this embodiment of the present disclosure, a value of the smoothing factor fac3 may be: fac3=0.75, and a corresponding smoothing factor fac4 may be: fac4=1−0.75=0.25.

407. The server encodes an adjusted value of the global stereo phase parameter of the current frame.

The server may encode the adjusted value of the global stereo phase parameter of the current frame in a manner of 5-bit (bit) quantizing and encoding, where the first bit is a flag bit of the stereo phase parameter, and the second bit to the fifth bit are values obtained after encoding processing is performed on the adjusted value of the global stereo phase parameter of the current frame. Specifically, when flag=1, the server transmits a quantized value of the G_ITD of the current frame; when flag=0, the server transmits a quantized value of the G_IPD of the current frame.

According to the method for encoding a stereo phase parameter provided in this embodiment of the present disclosure, first, a global stereo phase parameter of a current frame is acquired; then, a value of the global stereo phase parameter of the current frame is determined, and the value of the global stereo phase parameter of the current frame is adjusted according to a determining result of the value of the global stereo phase parameter of the current frame; and finally, an adjusted value of the global stereo phase parameter of the current frame is encoded. Compared with the existing technology that stereo phase information is directly recovered by extracting a global parameter, in this embodiment of the present disclosure, stereo phase information is recovered by using an adjusted global parameter, which can improve accuracy of the stereo phase information, thereby improving an effect of stereo audio phase information.

Figure 5:
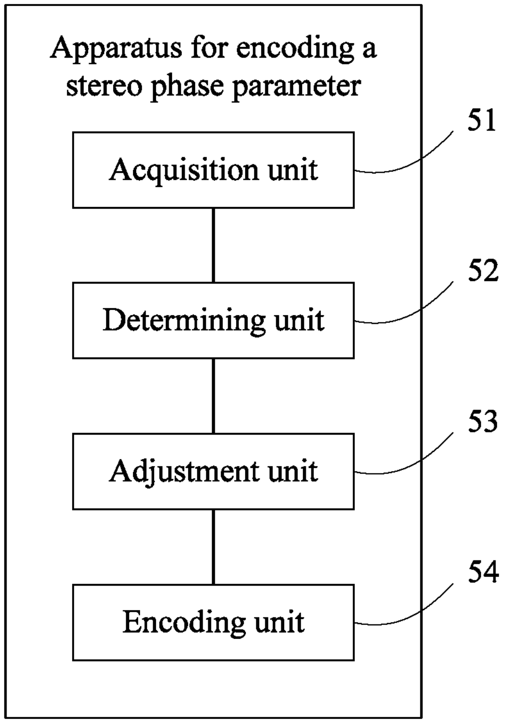
FIG. 5 is a schematic structural diagram of an apparatus for encoding a stereo phase parameter according to an embodiment of the present disclosure.

An embodiment of the present disclosure provides an apparatus for encoding a stereo phase parameter. An entity of the apparatus may be a server, and as shown in FIG. 5, the apparatus includes an acquisition unit 51, a determining unit 52, an adjustment unit 53, and an encoding unit 54.

The acquisition unit 51 is configured to acquire a global stereo phase parameter of a current frame.

The determining unit 52 is configured to determine a value of the global stereo phase parameter of the current frame acquired by the acquisition unit 51.

The adjustment unit 53 is configured to adjust the value of the global stereo phase parameter of the current frame according to a determining result of the value of the global stereo phase parameter of the current frame determined by the determining unit 52.

The encoding unit 54 is configured to encode a value of the global stereo phase parameter of the current frame adjusted by the adjustment unit 53.

Figure 6:
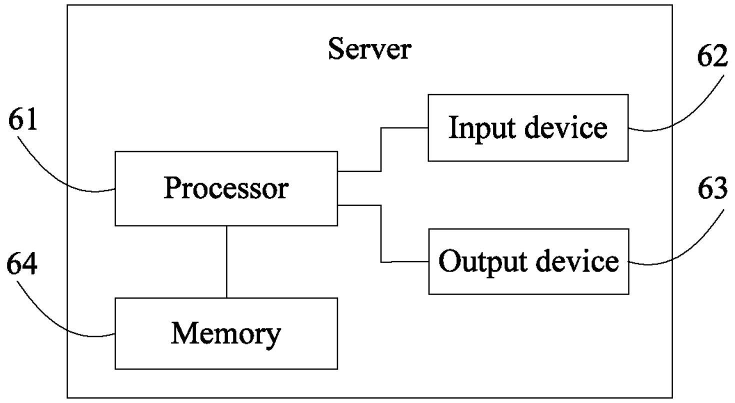
FIG. 6 is a schematic structural diagram of a server according to an embodiment of the present disclosure.

Further, the entity of the apparatus for encoding a stereo phase parameter may be a server. As shown in FIG. 6, the server may include a processor 61, an input device 62, an output device 63, and a memory 64, where the input device 62, the output device 63, and the memory 64 are connected to the processor 61.

The processor 61 is configured to acquire a global stereo phase parameter of a current frame.

The processor 61 is further configured to determine a value of the global stereo phase parameter of the current frame.

The processor 61 is further configured to adjust the value of the global stereo phase parameter of the current frame according to a determining result of the value of the global stereo phase parameter of the current frame.

The processor 61 is further configured to encode an adjusted value of the global stereo phase parameter of the current frame.

It should be noted that, for other corresponding descriptions of functional units in the apparatus for encoding a stereo phase parameter provided in this embodiment of the present disclosure, reference may be made to corresponding descriptions in FIG. 1, and details are not repeatedly described herein.

Figure 7:
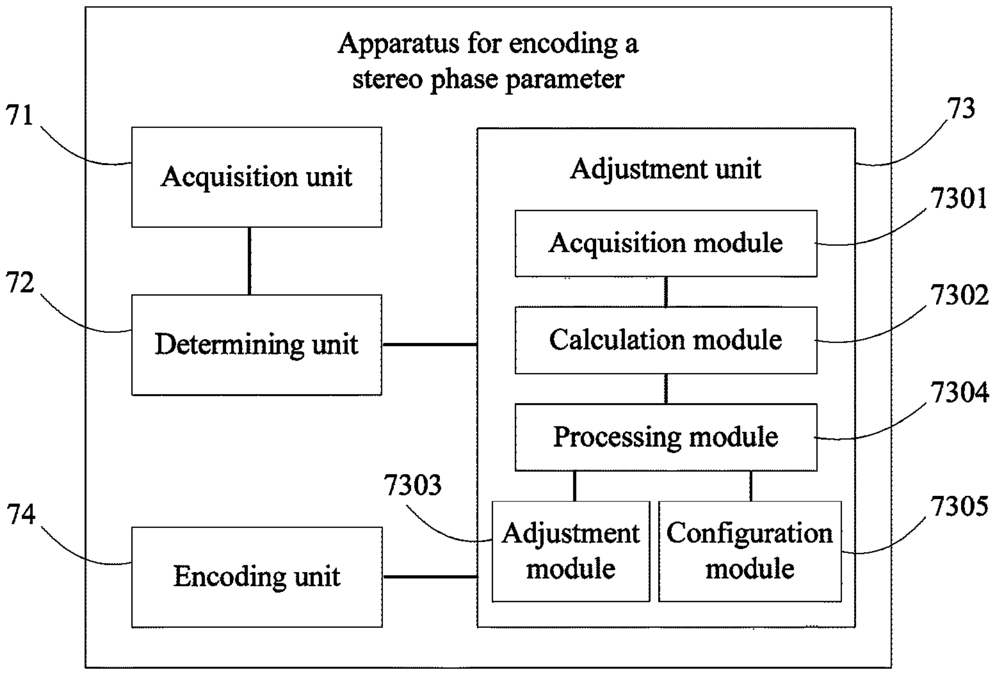
FIG. 7 is a schematic structural diagram of another apparatus for encoding a stereo phase parameter according to an embodiment of the present disclosure.

An embodiment of the present disclosure provides another apparatus for encoding a stereo phase parameter. An entity of the apparatus may be a server, and as shown in FIG. 7, the apparatus includes an acquisition unit 71, a determining unit 72, an adjustment unit 73, and an encoding unit 74.

The acquisition unit 71 is configured to acquire a global stereo phase parameter of a current frame.

The determining unit 72 is configured to determine a value of the global stereo phase parameter of the current frame acquired by the acquisition unit 71.

The adjustment unit 73 is configured to adjust the value of the global stereo phase parameter of the current frame according to a determining result of the value of the global stereo phase parameter of the current frame determined by the determining unit 72.

The encoding unit 74 is configured to encode a value of the global stereo phase parameter of the current frame obtained by adjusting by the adjustment unit 73.

The adjustment unit 73 includes an acquisition module 7301, a calculation unit 7302, and an adjustment module 7303.

The acquisition module 7301 is configured to acquire inter-channel time differences of sub-bands of the current frame.

The calculation module 7302 is configured to calculate an average value of absolute values of the inter-channel time differences of the sub-bands of the current frame according to the inter-channel time differences of the sub-bands of the current frame acquired by the acquisition module 7301.

The adjustment module 7303 is configured to adjust the value of the global stereo phase parameter of the current frame according to the determining result of the value of the global stereo phase parameter of the current frame and the average value of the absolute values of the inter-channel time differences of the sub-bands of the current frame calculated by the calculation module 7302.

The adjustment unit 73 further includes a processing module 7304.

The processing module 7304 is configured to perform inter-frame smoothing processing on the average value of the absolute values of the inter-channel time differences of the sub-bands of the current frame calculated by the calculation module 7302.

The acquisition module 7301 is further configured to acquire an average value of the absolute values of the inter-channel time differences of the sub-bands of the current frame smoothed by the processing module 7304.

The adjustment module 7303 is further configured to adjust the value of the global stereo phase parameter of the current frame according to the determining result of the value of the global stereo phase parameter of the current frame and the smoothed average value of the absolute values of the inter-channel time differences of the sub-bands of the current frame acquired by the acquisition module 7301.

The global stereo phase parameter acquired by the acquisition unit 71 includes a group delay (G_ITD) parameter.

The adjustment module 7303 is further configured to: when the determining result of the value of the global stereo phase parameter of the current frame is that a value of the G_ITD parameter is not 0, adjust the value of the G_ITD parameter of the current frame according to the smoothed average value of the absolute values of the inter-channel time differences of the sub-bands of the current frame acquired by the acquisition module 7301.

The adjustment module 7303 is further configured to adjust an absolute value of the value of the G_ITD parameter of the current frame according to a formula $|G\_ITD'|=fac1\times|G\_ITD|+fac2\times ITD\_sm$, where $|G\_ITD'|$ is an adjusted absolute value of the value of the G_ITD parameter, $|G\_ITD|$ is the absolute value of the value of the G_ITD parameter, ITD_sm is the smoothed average value of the absolute values of the inter-channel time differences of the sub-bands of the current frame, and fac1 and fac2 are smoothing factors, where fac1>0, fac2>0, and fac1+fac2=1.

The smoothing factor during adjustment by the adjustment module 7303 meets: fac1=0.5.

The global stereo phase parameter acquired by the acquisition unit 71 includes the group delay (G_ITD) parameter and a group phase (G_IPD) parameter.

The adjustment module 7303 is further configured to: when the determining result of the value of the global stereo phase parameter of the current frame is that the value of the G_ITD parameter is 0, adjust a value of the G_IPD parameter of the current frame according to the smoothed average value of the absolute values of the inter-channel time differences of the sub-bands of the current frame acquired by the acquisition module 7301.

The adjustment module 7303 is further configured to: when the determining result of the value of the global stereo phase parameter of the current frame is that the value of the G_ITD parameter is 0 and the value of the G_IPD parameter of the current frame is not 0, adjust an absolute value of the value of the G_IPD parameter according to a formula $|G\_IPD'|=fac3\times|G\_IPD|+fac4\times IPD\_sm$, where $|G\_IPD'|$ is an adjusted absolute value of the value of the G_IPD parameter; $|G\_IPD|$ is the absolute value of the value of the G_IPD parameter; fac3 and fac4 are smoothing factors, where fac3>0, fac4>0, and fac3+fac4=1; and $$IPD\_sm = \frac{2\pi K \times ITD\_sm}{FFT\_LEN},$$

where FFT_LEN is a transform length, K is a frequency bin value, ITD_sm is the smoothed average value of the absolute values of the inter-channel time differences of the sub-bands of the current frame, and IPD_sm is a smoothed average value of absolute values of inter-channel phase differences of the sub-bands of the current frame.

The smoothing factor during adjustment by the adjustment module 7303 meets: fac3=0.75.

The adjustment unit 73 further includes a configuration module 7305.

The configuration module 7305 is configured to: when the determining result of the value of the global stereo phase parameter of the current frame is that the value of the G_ITD parameter is 0 and the value of the G_IPD parameter of the current frame is 0, use an average value of absolute values of inter-channel phase differences of the sub-bands of the current frame smoothed by the processing module 7304, as an absolute value of the G_IPD parameter of the current frame, and use a symbol of a G_IPD parameter of a previous frame of the current frame as a symbol of the G_IPD parameter of the current frame.

The processing module 7304 is further configured to perform inter-frame smoothing processing according to a formula $ITD\_sm(k)=fac5\times ITD\_sm(k-1)+fac6\times ITD$, where $ITD\_sm(k)$ is the smoothed average value of the absolute values of the inter-channel time differences of the sub-bands of the current frame, $ITD\_sm(k-1)$ is a smoothed average value of absolute values of inter-channel time differences of sub-bands of the previous frame of the current frame, and fac5 and fac6 are smoothing factors, where fac5>0, fac6>0, and fac5+fac6=1.

The smoothing factor during smoothing processing by the processing module 7304 meets: fac5=0.9844.

Figure 8:
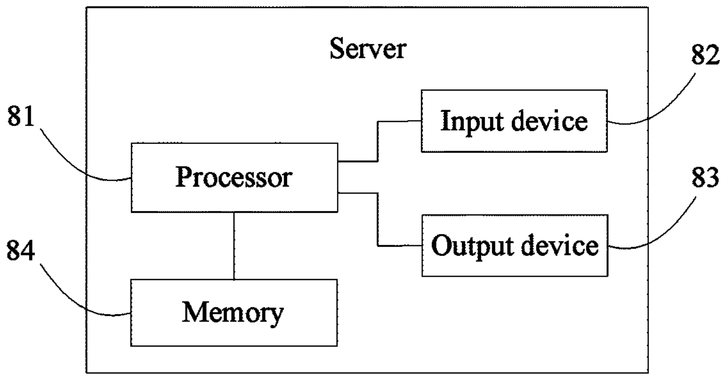
FIG. 8 is a schematic structural diagram of another server according to an embodiment of the present disclosure.

Further, the entity of the apparatus for encoding a stereo phase parameter may be a server. As shown in FIG. 8, the server may include a processor 81, an input device 82, an output device 83, and a memory 84, where the input device 82, the output device 83, and the memory 84 are connected to the processor 81.

The processor 81 is configured to acquire a global stereo phase parameter of a current frame.

The processor 81 is further configured to determine a value of the global stereo phase parameter of the current frame.

The processor 81 is further configured to adjust the value of the global stereo phase parameter of the current frame according to a determining result of the value of the global stereo phase parameter of the current frame.

The processor 81 is further configured to encode an adjusted value of the global stereo phase parameter of the current frame.

The processor 81 is further configured to acquire inter-channel time differences of sub-bands of the current frame.

The processor 81 is further configured to calculate an average value of absolute values of the inter-channel time differences of the sub-bands of the current frame according to the inter-channel time differences of the sub-bands of the current frame.

The processor 81 is further configured to adjust the value of the global stereo phase parameter of the current frame according to the determining result of the value of the global stereo phase parameter of the current frame and the average value of the absolute values of the inter-channel time differences of the sub-bands of the current frame.

The processor 81 is further configured to perform inter-frame smoothing processing on the average value of the absolute values of the inter-channel time differences of the sub-bands of the current frame.

The processor 81 is further configured to acquire a smoothed average value of the absolute values of the inter-channel time differences of the sub-bands of the current frame.

The processor 81 is further configured to adjust the value of the global stereo phase parameter of the current frame according to the determining result of the value of the global stereo phase parameter of the current frame and the smoothed average value of the absolute values of the inter-channel time differences of the sub-bands of the current frame.

The global stereo phase parameter acquired by the processor 81 includes a group delay (G_) parameter.

The processor 81 is further configured to: when the determining result of the value of the global stereo phase parameter of the current frame is that a value of the G_ITD parameter is not 0, adjust the value of the G_ITD parameter of the current frame according to the smoothed average value of the absolute values of the inter-channel time differences of the sub-bands of the current frame.

The processor 81 is further configured to adjust an absolute value of the value of the G_ITD parameter of the current frame according to a formula $|G\_ITD'|=fac1\times|G\_ITD|+fac2\times ITD\_sm$, where $|G\_ITD'|$ is an adjusted absolute value of the G_ITD parameter, $|G\_ITD|$ is the absolute value of the value of the G_ITD parameter, ITD_sm is the smoothed average value of the absolute values of the inter-channel time differences of the sub-bands of the current frame, and fac1 and fac2 are smoothing factors, where fac1>0, fac2>0, and fac1+fac2=1.

The smoothing factor during adjustment by the processor 81 meets: fac1=0.5.

The global stereo phase parameter acquired by the processor 81 includes the group delay (G_ITD) parameter and a group phase (G_IPD) parameter.

The processor 81 is further configured to: when the determining result of the value of the global stereo phase parameter of the current frame is that the value of the G_ITD parameter is 0, adjust a value of the G_IPD parameter of the current frame according to the smoothed average value of the absolute values of the inter-channel time differences of the sub-bands of the current frame.

The processor 81 is further configured to: when the determining result of the value of the global stereo phase parameter of the current frame is that the value of the G_ITD parameter is 0 and the value of the G_IPD parameter of the current frame is not 0, adjust an absolute value of the value of the G_IPD parameter according to a formula $|G\_IPD'|=fac3\times|G\_IPD|+fac4\times IPD\_sm$, where $|G\_IPD'|$ is an adjusted absolute value of the value of the G_IPD parameter; $|G\_IPD|$ is the absolute value of the value of the G_IPD parameter; fac3 and fac4 are smoothing factors, where fac3>0, fac4>0, and fac3+fac4=1; and $$IPD\_sm = \frac{2\pi K \times ITD\_sm}{FFT\_LEN},$$

where $FFT_{\_LEN}$ is a transform length, K is a frequency bin value, ITD_sm is the smoothed average value of the absolute values of the inter-channel time differences of the sub-bands of the current frame, and IPD_sm is a smoothed average value of absolute values of inter-channel phase differences of the sub-bands of the current frame.

The smoothing factor during adjustment by the processor 81 meets: fac3=0.75.

The processor 81 is further configured to: when the determining result of the value of the global stereo phase parameter of the current frame is that the value of the G_ITD parameter is 0 and the value of the G_IPD parameter of the current frame is 0, use a smoothed average value of absolute values of inter-channel phase differences of the sub-bands of the current frame as an absolute value of the G_IPD parameter of the current frame, and use a symbol of a G_IPD parameter of a previous frame of the current frame as a symbol of the G_IPD parameter of the current frame.

The processor 81 is further configured to perform inter-frame smoothing processing according to a formula $ITD\_sm(k)=fac5\times ITD\_sm(k-1)+fac6\times ITD$, where ITD_sm(k) is the smoothed average value of the absolute values of the inter-channel time differences of the sub-bands of the current frame, ITD_sm(k−1) is a smoothed average value of absolute values of inter-channel time differences of sub-bands of the previous frame of the current frame, and fac5 and fac6 are smoothing factors, where fac5>0, fac6>0, and fac5+fac6=1.

The smoothing factor during smoothing processing by the processor 81 meets: fac5=0.9844. It should be noted that, for other corresponding descriptions of functional units in the apparatus for encoding a stereo phase parameter provided in this embodiment of the present disclosure, reference may be made to corresponding descriptions in FIG. 2, and details are not repeatedly described herein.

The apparatus for encoding a stereo phase parameter provided in embodiments of the present disclosure can implement the foregoing provided method embodiments. For detailed function implementation, reference may be made to descriptions in the method embodiments, and details are not repeatedly described herein. The method and the apparatus for encoding a stereo phase parameter that are provided in the embodiments of the present disclosure are applicable to recovering stereo phase information, but are not limited thereto.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The foregoing storage medium may include: a magnetic disk, an optical disc, a read-only memory (Read-Only Memory, ROM), or a random access memory (Random Access Memory, RAM).

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for encoding a stereo phase parameter of a stereo audio signal, the method comprising:

acquiring a global stereo phase parameter of a current frame, wherein the global stereo phase parameter comprises a group delay (G_ITD) parameter;

determining whether a value of the G_ITD parameter of the current frame is equal to 0;

when the value of the G_ITD parameter of the current frame is not equal to 0, adjusting the value of the G_ITD parameter of the current frame as follows:

a) acquiring Inter-Channel Time Differences (ITDs) of sub-bands of the current frame;

b) calculating an average value of absolute values of the ITDs of the sub-bands of the current frame; and c) adjusting the value of the G_ITD parameter of the current frame according to the average value of the absolute values of the ITDs of the sub-bands of the current frame; and encoding a value of the global stereo phase parameter of the current frame based on the adjusted value of the G_ITD.

2. The method for encoding a stereo phase parameter according to claim 1, further comprising:

performing inter-frame smoothing processing on the average value of the absolute values of the ITDs of the sub-bands of the current frame when the current frame is not the first frame of a data stream, so as to acquire a smoothed average value of the absolute values of the ITDs of the sub-bands of the current frame; and wherein the value of the G_ITD parameter of the current frame is adjusted according to the smoothed average value of the absolute values of the ITDs of the sub-bands of the current frame.

3. The method for encoding a stereo phase parameter according to claim 2, wherein the value of the G_ITD parameter of the current frame is adjusted according to the smoothed average value of the absolute values of the ITDs of the sub-bands of the current frame as follows:

adjusting an absolute value of the value of the G_ITD parameter of the current frame according to a formula $|G\_ITD'|=fac1\times|G\_ITD|+fac2\times ITD\_sm$, wherein $|G\_ITD'|$ is an adjusted absolute value of the value of the G_ITD parameter, $|G\_ITD|$ is the absolute value of the value of the G_ITD parameter, ITD_sm is the smoothed average value of the absolute values of the ITDs of the sub-bands of the current frame, and fac1 and fac2 are smoothing factors, wherein fac1>0, fac2>0, and fac1+fac2=1.

4. The method for encoding a stereo phase parameter according to claim 3, wherein fac1=0.5.

5. The method for encoding a stereo phase parameter according to claim 2, wherein the global stereo phase parameter further comprises a group phase (G_IPD) parameter;

the method further comprises:

adjusting the value of the G_IPD parameter of the current frame according to the smoothed average value of the absolute values of the ITDs of the sub-bands of the current frame when the value of the G_ITD parameter is equal to 0.

6. The method for encoding a stereo phase parameter according to claim 5, wherein:

when the value of the G_IPD parameter of the current frame is not equal to 0, then adjusting an absolute value of the value of the G_IPD parameter according to a formula $|G\_IPD'|=fac3\times|G\_IPD|+fac4\times IPD\_sm$, wherein $|G\_IDP'|$ is an adjusted absolute value of the value of the G_IPD parameter; $|G\_IPD|$ is the absolute value of the value of the G_IPD parameter; fac3 and fac4 are smoothing factors, wherein fac3>0, fac4>0, and fac3+fac4=1; and $$IPD\_sm = \frac{2\pi K \times ITD\_sm}{FFT\_LEN},$$

wherein FFT_LEN is a transform length, K is a frequency bin value, ITD_sm is the smoothed average value of the absolute values of the ITDs of the sub-bands of the current frame, and IPD_sm is the smoothed average value of absolute values of ITDs of the sub-bands of the current frame.

7. The method for encoding a stereo phase parameter according to claim 6, wherein fac3=0.75.

8. The method for encoding a stereo phase parameter according to claim 5, wherein:

when the value of the G_IPD parameter of the current frame is equal to 0, as an absolute value of the value of G_IPD parameter of the current frame is equal to a smoothed average value of absolute values of inter-channel phase differences of the sub-bands of the current frame, and a symbol of the G_IPD parameter of the current frame is the same as a symbol of a G_IPD parameter of a previous frame of the current frame.

9. The method for encoding a stereo phase parameter according to claim 2, wherein the inter-frame smoothing processing is performed according to a formula $ITD\_sm(k)=fac5\times ITD\_sm(k-1)+fac6\times ITD$, wherein ITD_sm(k) is the smoothed average value of the absolute values of the ITDs of the sub-bands of the current frame, ITD_sm(k−1) is a smoothed average value of absolute values of ITDs of sub-bands of the previous frame of the current frame, and fac5 and fac6 are smoothing factors, wherein fac5>0, fac6>0 and fac5+fac6=1.

10. The method for encoding a stereo phase parameter according to claim 9, wherein fac5=0.9844.

11. An apparatus for encoding a stereo phase parameter of a stereo audio signal, the apparatus comprising:

a memory for storing computer-executable instructions; and a processor operatively coupled to the memory, the processor, by executing the computer-executable instructions, is configured to:

acquire a global stereo phase parameter of a current frame, wherein the global stereo phase parameter comprises a group delay (G_ITD) parameter;

determine whether a value of the acquired G_ITD parameter of the current frame is equal to 0;

when the value of the G_ITD parameter of the current frame is not equal to 0, adjust the value of the G_ITD parameter of the current frame as follows:

a) acquire Inter-Channel Time Differences (ITDs) of sub-bands of the current frame;

b) calculate an average value of absolute values of the ITDs of the sub-bands of the current frame; and c) adjust the value of the G_ITD parameter of the current frame according to the average value of the absolute values of the ITDs of the sub-bands of the current frame; and encode an adjusted value of the global stereo phase parameter of the current frame based on the adjusted value of the G_ITD.

12. The apparatus for encoding a stereo phase parameter according to claim 11, wherein the processor, by executing the computer-executable instructions, is further configured to:

perform inter-frame smoothing processing on the average value of the absolute values of the ITDs of the sub-bands of the current frame when the current frame is not the first frame of a data stream, so as to acquire an average value of the absolute values of the ITDs of the sub-bands of the current frame; and wherein, in adjust the value of the G_ITD parameter of the current frame, the processor, by execute the computer-executable instructions, is configured to:

adjust the value of the G_ITD parameter of the current frame according to the smoothed average value of the absolute values of the ITDs of the sub-bands of the current frame.

13. The apparatus for encoding a stereo phase parameter according to claim 12, wherein in adjust the value of the G_ITD parameter of the current frame, the processor, by executing the computer-executable instructions, is configured to:

adjust an absolute value of the value of the G_ITD parameter of the current frame according to a formula $|G\_ITD'=fac1\times|G\_ITD|+fac2\times ITD\_sm$ wherein $|G\_ITD'|$ is an adjusted absolute value of the value of the G_ITD parameter, $|G\_ITD|$ is the absolute value of the value of the G_ITD parameter, ITD_sm is the smoothed average value of the absolute values of the ITDs of the sub-bands of the current frame, and fac1 and fac2 are smoothing factors, wherein fac1>0 fac2>0, and fac1+fac2=1.

14. The apparatus for encoding a stereo phase parameter according to claim 13, wherein fac1=0.5.

15. The apparatus for encoding a stereo phase parameter according to claim 12, wherein the global stereo phase parameter further comprises a group phase (G_IPD) parameter; and the processor, by executing the computer-executable instructions, is further configured to:

adjust the value of the G_IPD parameter of the current frame according to the smoothed average value of the absolute values of the ITDs of the sub-bands of the current frame when the value of the G_ITD parameter is equal to 0.

16. The apparatus for encoding a stereo phase parameter according to claim 15, wherein in adjust the value of the G_IPD parameter of the current frame, the processor, by executing the computer-executable instructions, is configured to:

adjust an absolute value of the value of the G_IPD parameter according to a formula $|G\_IPD'|=fac3\times|G\_IPD|+fac4\times IPD\_sm$ when the value of the G_IPD parameter of the current frame is not equal to 0, wherein $|G\_IPD'|$ is an adjusted absolute value of the value of the G_IPD parameter; $|G\_IPD|$ is the absolute value of the value of the G_IPD parameter; fac3 and fac4 are smoothing factors, wherein fac3>0 fac4>0, and fac3+fac4=1; and $$IPD\_sm = \frac{2\pi K \times ITD\_sm}{FFT\_LEN},$$

wherein FFT_LEN is a transform length, K is a frequency bin value, ITD_sm is the smoothed average value of the absolute values of the ITDs of the sub-bands of the current frame, and IPD_sm is a smoothed average value of absolute values of ITDs of the sub-bands of the current frame.

17. The apparatus for encoding a stereo phase parameter according to claim 16, wherein fac3=0.75.

18. The apparatus for encoding a stereo phase parameter according to claim 15, wherein when the value of the G_IPD parameter of the current frame is equal to 0, an absolute value of the value of G_IPD parameter of the current frame is equal to a smoothed average value of absolute values of inter-channel phase differences of the sub-bands of the current frame, and a symbol of the G_IPD parameter of the current frame the same as a symbol of a G_IPD parameter of a previous frame of the current frame.

19. The apparatus for encoding a stereo phase parameter according to claim 12, wherein in perform the inter-frame smoothing processing, the processor, by executing the computer-executable instructions, is configured to:

perform the inter-frame smoothing processing according to a formula $ITD\_sm(k)=fac5\times ITD\_sm(k-1)+fac6\times ITD$, wherein ITD_sm(k) is the smoothed average value of the absolute values of the ITDs of the sub-bands of the current frame, ITD_sm(k−1) is a smoothed average value of absolute values of ITDs of sub-bands of the previous frame of the current frame, and fac5 and fac6 are smoothing factors, wherein fac5>0, fac6>0, and fac5+fac6=1.

20. The apparatus for encoding a stereo phase parameter according to claim 19, wherein fac5=0.9844.

* * * * *